United States Patent [19]

Tabuki et al.

[11] Patent Number: 5,783,021
[45] Date of Patent: Jul. 21, 1998

[54] METHOD OF AND APPARATUS FOR APPLYING A FILM TO A SUBSTRATE

[75] Inventors: Yasushi Tabuki; Yoichi Matsubara, both of Kanagawa, Japan; Yoshimitsu Kato, Bridgend, United Kingdom

[73] Assignees: Sony Corporation, Tokyo, Japan; Sony United Kingdom Limited, Weybridge, England

[21] Appl. No.: 616,064

[22] Filed: Mar. 14, 1996

[30] Foreign Application Priority Data

Mar. 15, 1995 [GB] United Kingdom ............ 9505199

[51] Int. Cl.$^6$ .................. B32B 17/06; B32B 31/20
[52] U.S. Cl. .................. 156/295; 156/312; 156/575
[58] Field of Search .................. 156/295, 312, 156/103, 575; 348/824; 313/479

[56] References Cited

U.S. PATENT DOCUMENTS

| | | | |
|---|---|---|---|
| 3,948,657 | 4/1976 | Yoshikawa | 156/295 |
| 4,463,055 | 7/1984 | Hodges . | |
| 4,470,858 | 9/1984 | McMastes | 156/103 |
| 5,417,791 | 5/1995 | Beeteson | 156/295 |
| 5,653,837 | 8/1997 | Tabuki | 156/99 |

*Primary Examiner*—Daniel Stemmer
*Attorney, Agent, or Firm*—Frommer Lawrence & Haug LLP; William S. Frommer

[57] ABSTRACT

A method of applying a film, preferably of PET, to a surface, preferably the front surface of the panel of a CRT. Resin is first applied to the surface in a predetermined pattern. The film is then pressed against a part of the surface near one edge of it by a roller. The roller is then moved across the surface to press the film onto the resin. The pressure exerted by the roller is reduced in the middle of the surface as compared with that exerted at the edge. Two different pressures may be used in the middle part.

9 Claims, 4 Drawing Sheets

METHOD OF AND APPARATUS FOR APPLYING A FILM TO A SUBSTRATE

The present invention relates to a method for applying a film to a substrate, particularly for applying a protective film to a glass panel forming the front of a cathode ray tube (CRT), and to apparatus for carrying out the method.

CRT's are generally constructed from separately formed funnel and panel sections. The panel is moulded by cutting an appropriate length off a rod of hot glass, then placing the cut-off length in a mould, the two halves of which are pressed together to shape the panel. The lower part of the mould corresponds to the front of the panel and the upper to the inner surface. The inner surface must be made very accurately to receive the phosphors and most attention is taken with it. In cutting off the length from the hot rod the ends of it are cooled by the metal cutter.

As shown in FIG. 1 of the accompanying drawings, when the panel 1 is pressed into shape in the mould these cool ends leave marks on what will be the front surface of the CRT known as the "spew mark" 3 and "share mark" 5. FIG. 1 also shows the "bottom number" 7 which is often engraved by the manufacturer in the mould to enable identification of the batch or mould in which the panel was made. The spew and share marks are both indentations in the surface of the panel, the spew mark is generally deeper and may be up to 60 micrometers deep. Because the bottom number is engraved in the bottom half of the mould, it appears as a raised mark on the panel surface of up to 70 micrometers.

The spew and share marks and the bottom number are all visible on the outer surface of the panel and are clearly undesirable as they will spoil the appearance of the finished display and obscure the picture displayed thereon. It is sometimes possible to arrange that these marks are formed on the outer surfaces of the panel skirt rather than its front face however there are generally still sufficient imperfections in the front surface to necessitate further treatment of it. It is possible to grind and polish the front surface to a sufficiently smooth finish but this can be expensive.

It has been proposed, instead of grinding the panel, to laminate it with a layer of resin of the same refractive index as the glass and an outer protective film. First ultraviolet curable resin is applied to the outer surface of the panel 1. Next film is applied using roller which rolls rightwards across the front panel of the CRT to press the film onto the resin without allowing any air bubbles to form. The roller is quite heavy and is allowed to rest with its own weight on the panel. As the roller is moved across the panel, the pressure exerted by the roller on the film reduces across the width of the CRT due to the shape of the panel, as shown in FIG. 3A. The resin is then cured by exposure to UV light. The film laminated CRT is assembled into the cabinet of the television receiver or monitor, and the peripheral area of the screen outside the effective viewing area is covered by the front bevel of the cabinet.

This method has disadvantages that if the thickness of the resin is insufficient the bottom number may still be visible whilst if the resin thickness is increased, undesirable pressure is exerted on the panel and the front bevel, resulting in possible breakage of the bevel.

According to the present invention there is provided: a method of applying a film to the surface of a substrate, the method comprising the steps of:

applying a resin to the surface;

pressing, with a pressure member, a part of the film against a first edge part of the surface; and moving said pressure member across the surface towards a second edge opposite the first edge to press the film against the surface, the pressure applied to the film by said pressure member in a middle part of the surface being less than that applied at parts adjacent the two edges.

Preferably the pressure member exerts a first predetermined pressure, e.g. 15 kgf/member, in parts adjacent the two edges and a second predetermined pressure, e.g. 4 kgf/member in the middle part, the second predetermined pressure being less than the first. More preferably the pressure member exerts a second predetermined pressure in a first middle part of the surface near the first edge and a third predetermined pressure in a second middle part of the surface near the second edge, the third predetermined pressure being higher than the second predetermined pressure but lower than the first predetermined pressure. In this case the first second and third predetermined pressures may be 15, 4 and 8 kgf/member respectively. The actual values of the pressure to be applied will depend, among other things, on the shape and size of the panel.

The pressure member is preferably A roller. The pressure it exerts on the panel may be controlled by lifting it against its weight with an air cylinder exerting a controllable upward force, rather than by exerting an additional downward force on it.

Preferably the resin is applied to a part of the surface adjacent the first edge. Resin may also be applied to parts near the ends of the second edge.

The resin is preferably an acrylate radical polymerisation ultra-violet curable resin and the method preferably comprises the further step of curing the resin by exposing it to ultra-violet light. The viscosity of the resin is preferably between 800 cps and 2,500 cps under 25° C.

The present invention will be further described hereinafter with reference to the following description of exemplary embodiments and the accompanying drawings, in which.

Figure 5A:
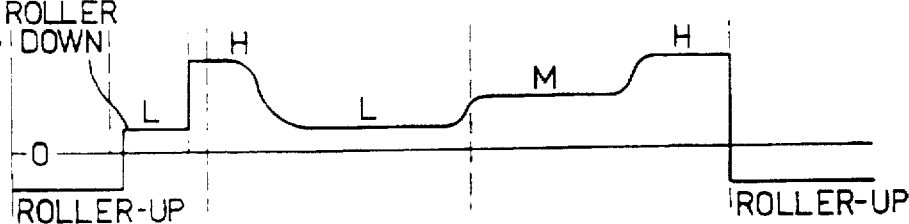
Figure 5B:
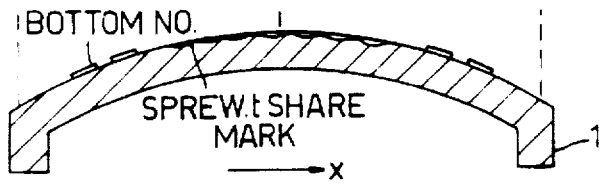
Figure 6:
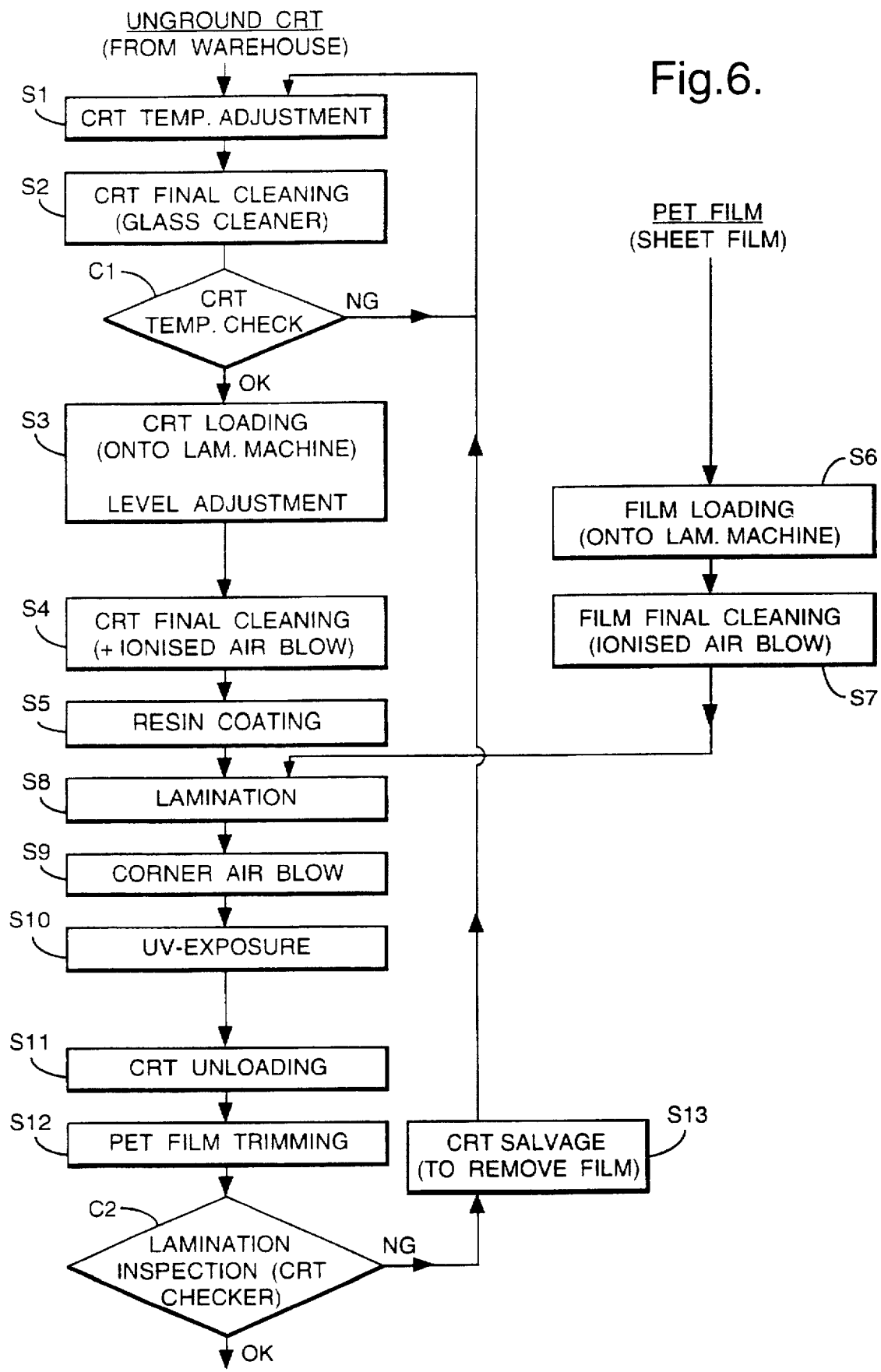

FIGS. 4A–F are plan views of the front panel of a CRT showing different resin coating patterns used in the method according to the present invention;

FIG. 5A is a graph showing the pressure applied by the roller in a second method according to the invention and FIG. 5B is a cross-sectional view of the front panel;

FIG. 6 is a flow chart of the complete lamination operation; and

Figure 7:
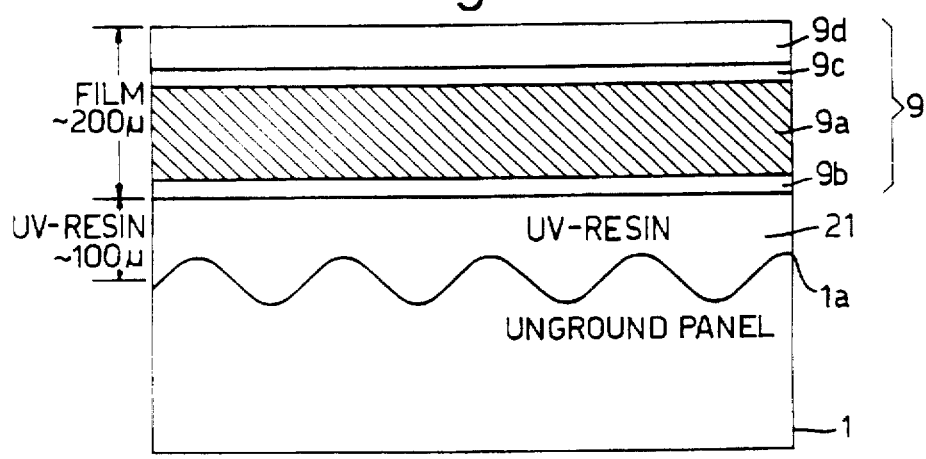

FIG. 7 is a cross-sectional view of a laminated CRT front panel.

In the drawings like parts are indicated by like numerals.

Figure 1:
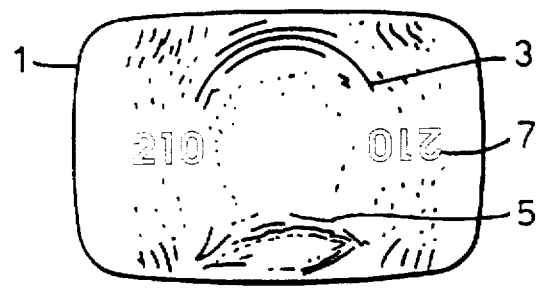
FIG. 1 is a plan view of the front of an unground panel for a CRT.
Figure 2:
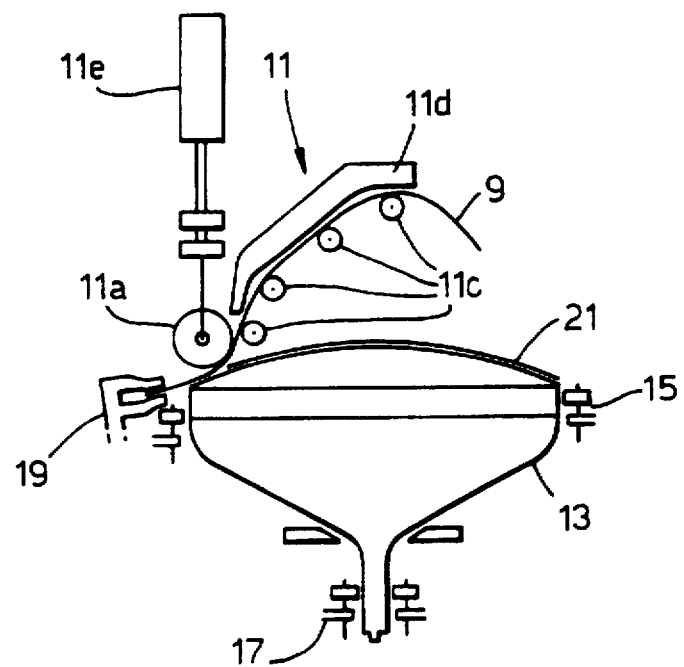
FIG. 2 is a schematic side view of an apparatus for applying a film to the front surface of the front panel of a CRT.

FIG. 2 shows a film applying apparatus used in the invention. The CRT 13 is held by chucks 15 and 17 at its neck and at the edge of the front panel 1 respectively. These chucks ensure the CRT is accurately located for the lamination process. The roller assembly 11 includes a main roller 11a made of rubber and of approximately 80 mm diameter. This roller weighs approximately 15 kg. The film 9, which has previously been cut to an appropriate length from a continuous roll, is guided to the main roller 11a by plastics guide rollers 11c, of approximate diameter 25 mm, and by plastics guide rail 11d. Its end is held by film chuck 19. The roller assembly is moved into place as a unit after the CRT 13, which has previously been coated with resin 21, is put in position. The pressure exerted by the roller on the panel is controlled by an air cylinder 11e which exerts a controllable upward force on the roller.

Figure 3A:
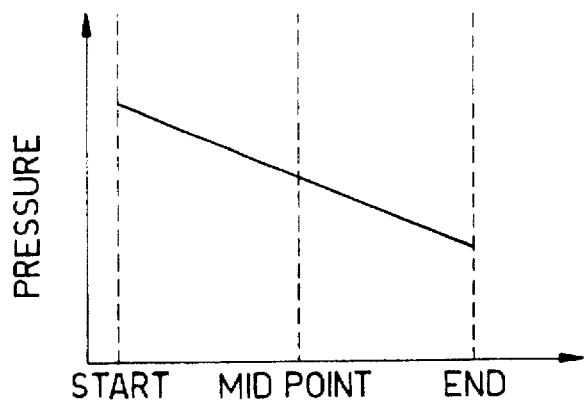
FIG. 3A is a graph showing the pressure applied by a roller in the prior art.
Figure 3B:
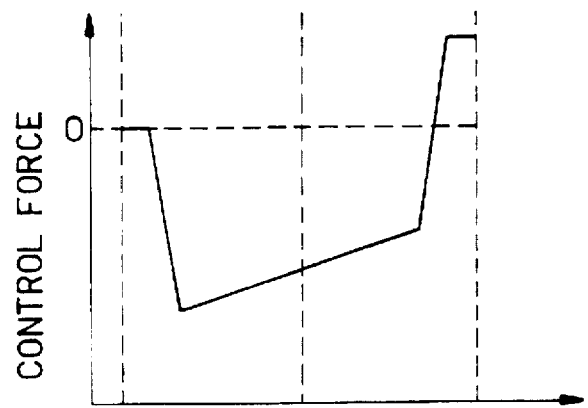
FIG. 3B is a graph showing the upward control pressure applied to the roller in a first method according to the invention.
Figure 3C:
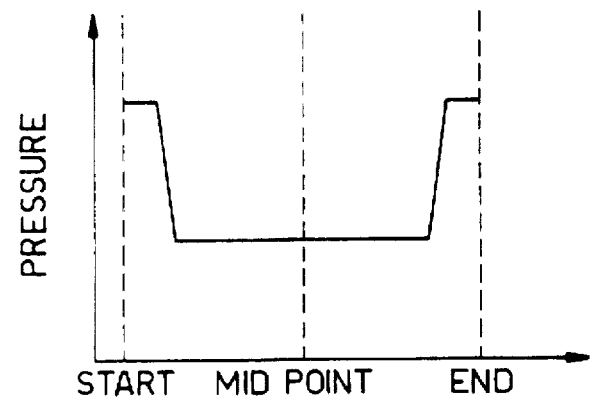
FIG. 3C is a graph showing the actual pressure exerted by the roller on the panel in the first method according to the invention.

FIG. 3B shows the control force applied to the roller in a first method according to the invention. In the graph, downward force is shown as positive. Initially no control force is applied to the roller so it exerts a relatively, e.g. 15 kgf for a 25" CRT, due to its own weight. An upward control force is quickly applied, after the roller has been moved a short way, so that the pressure exerted by the roller on the glass is reduced quickly and substantially, e.g. to 4 kgf for the same CRT. As the roller is moved further across the panel, the upward control force is steadily reduced to maintain constant the actual force exerted on the panel. As the roller approaches the other edge, the upward control force is reduced to zero and a downward force applied so that the roller pressure is increased quickly to its initial level for the final part of the panel. The effective force exerted by the roller on the CRT is shown in FIG. 3C. If the panel surface is flatter, the pressure shown in FIG. 3A will also be and the control force can also be flatter in the middle part.

Figure 4A:
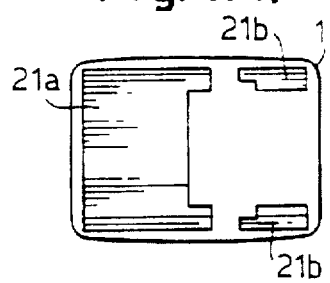
Figure 4B:
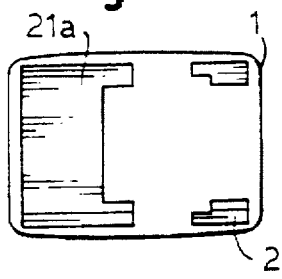
Figure 4C:
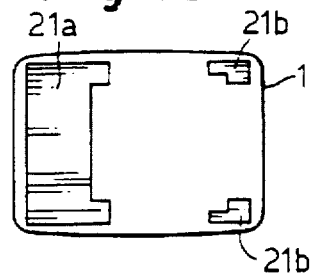
Figure 4D:
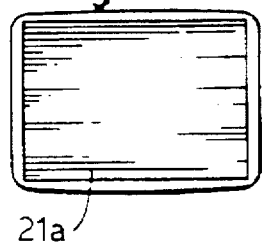
Figure 4E:
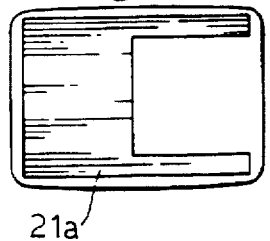
Figure 4F:
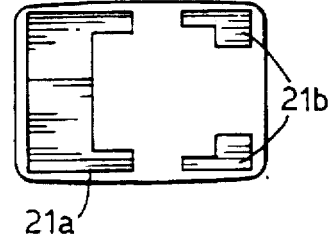

FIGS. 4A to C show the different resin coating patterns used. Each pattern comprises a main coating area 21a in the half of the panel to which the film is applied first and supplementary areas in the corners reached last by the film. Which coating pattern is used depends on the average of the ambient temperature of the lamination room and the temperature of the panel to which resin is to be applied. If this average temperature is below 22° C. the maximum coating program, shown in FIG. 4A, is used. This pattern uses 53 g of resin. If the average temperature is between 22° and 23° C. the standard coating pattern, shown in FIG. 4B and which uses 48 g of resin, is used. If the average temperature is between 23° and 25° C. the minimum coating pattern, shown in FIG. 4C and which uses 43 g of resin, is used. Which coating pattern is used may also depend on the local unevenness of the panel surface profile. If the unevenness is large (the deviation from the designed outer surface profile is greater than ±0.5 mm), the coating pattern shown in FIG. 4D can be used. If the unevenness is average (the deviation is between ±0.3 and 0.5 mm), the standard pattern shown in FIG. 4E can be used. If the unevenness is small (the deviation is less than ±0.3 mm), the minimum coating pattern shown in FIG. 4F can be used.

The pressures applied to the CRT in a second method according to the invention are shown in FIG. 5A. When initially lowered onto the panel, the air cylinder controls the roller 11a to exert a pressure of approximately 4 kgf for a 25" screen. This is allowed to increase to a high pressure of approximately 15 kgf as the roller 11a begins to move and is maintained at this level until the first bottom numbering a passed. The roller pressure is then reduced to a low pressure of approximately 4 kgf until the mid point of the panel where it is increased to a medium pressure of approximately 8 kgf. After the second bottom number has been passed the roller pressure is again increased to the high pressure of 15 kgf for the remainder of the width of the panel. As shown in FIG. 5A, the pressure exerted by the roller is controlled to change smoothly between levels to avoid sudden changes in resin thickness which might be visible.

As shown in FIG. 5B, the aim is to attain a resin thickness of approximately 30–150 µm over the edge parts outside the bottom numbers and attain a resin thickness of approximately 50–250 µm over the middle part where the bottom numbers and spew and share marks are.

Sometimes, resin may be squeezed out of the edges of the film. This resin is exposed to air and does not cure properly, remaining tacky and attracting dust. This problem has been solved by applying tape, or a layer of resin that does cure in air, over the squeezed out resin.

FIG. 6 is a flow diagram of the complete lamination process. First, in step S1 the unground CRT from the warehouse is brought to the correct temperature and cleaned with glass cleaner, step S2. Its temperature is then checked at C1. If at the correct temperature the CRT is loaded into the lamination machine and its a level adjusted at step S3. If not it is returned to step S1 for further temperature adjustment. Once the CRT is loaded into the lamination machine it is cleaned again with ionised air, step S4. The appropriate amount of resin is then added, at step 5. Meanwhile a cut sheet of PET film is loaded onto the roller assembly, step S6, and cleaned, step S7. The lamination itself is carried out at step S8 and thereafter air is blown at the corners of the film to prevent them curling, step S9, and the CRT is exposed to ultra-violet light to cure the resin, step S10. At step S11 the CRT is unloaded and the edge of the PET film trimmed, step S12. The lamination is inspected at step C2 and if it passes the CRT passed to the next procedure in the manufacturing process. If the lamination has not been done correctly the film is removed at step S13 and the CRT returned to the beginning of the process.

FIG. 7 is a cross-sectional view of the laminated panel in the middle part. The rough surface of the panel is shown at 1a and is covered by a layer of resin 21 which averages approximately 30–250 µm thick. The film 9, which forms the outer layer of the lamination comprises a PET substrate 9a approximately 130–350 µm thick. On either side of this are primer layers 9b & c approximately less than 0.01 µm thick. On the top surface of the upper primer layer 9c is a hard coating 9d. This is approximately 5–20 µm thick.

The film may be coloured, e.g. grey, if desired, to enhance the appearance of the display.

We claim:

1. A method of applying a film to the surface of a substrate, the method comprising the steps of:

applying a resin to the surface;
   pressing, with a pressure member, a part of the film against a first edge part of the surface; and
   moving said pressure member across the surface towards a second edge opposite the first edge to press the film against the surface, the pressure applied to the film by said pressure member in a middle part of the surface being less than that applied at parts adjacent the two edges.

2. The method according to claim 1 wherein the pressure member exerts a first predetermined pressure in parts adjacent the two edges and a second predetermined pressure in the middle part, the second predetermined pressure being less than the first.

3. The method according to claim 1 wherein the pressure member exerts a second predetermined pressure in a first middle part of the surface near the first edge and a third predetermined pressure in a second middle part of the surface near the second edge, the third predetermined pressure being higher than the second predetermined pressure but lower than the first predetermined pressure.

4. The method according to claim 1, wherein said applying step comprises applying resin to a part of the surface adjacent the first edge.

5. The method according to claim 4 wherein said applying step further comprises applying resin to parts near the ends of the second edge.

6. The method according to claim 1 wherein the resin is an acrylate radical polymerisation ultra-violet curable resin and the method comprises the further step of curing the resin by exposing it to ultra-violet light.

7. The method according to claim 1 wherein the film is a polyethylene terephthalate film.

8. The method according to claim 1 wherein the pressure member is a roller.

9. The method of claim 1 wherein the substrate is the front panel of a cathode ray tube (CRT) and the film is applied to the front surface of the front panel of the CRT.

* * * * *